United States Patent
Padmanabhan et al.

(10) Patent No.: US 10,081,165 B2
(45) Date of Patent: *Sep. 25, 2018

(54) COMPOSITE REINFORCED HYBRID WOOD FLOOR WITH WOOD STRIPS ARRANGED IN A PATTERN FOR VEHICULAR TRAILERS

(71) Applicant: Havco Woods Products, LLC, Cape Giraedeau, MO (US)

(72) Inventors: Gopalkrishna Padmanabhan, Fenton, MO (US); James N. Vangilder, Jackson, MO (US); M. Bruce Bader, O'Fallon, IL (US)

(73) Assignee: HAVCO WOOD PRODUCTS, LLC., Scott City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,998

(22) Filed: Feb. 20, 2015

(65) Prior Publication Data

US 2015/0239507 A1 Aug. 27, 2015

Related U.S. Application Data

(60) Provisional application No. 61/944,048, filed on Feb. 24, 2014.

(51) Int. Cl.
*B32B 21/08* (2006.01)
*B32B 3/14* (2006.01)
(Continued)

(52) U.S. Cl.
CPC ............ *B32B 21/08* (2013.01); *B32B 3/14* (2013.01); *B32B 7/12* (2013.01); *B32B 21/042* (2013.01);
(Continued)

(58) Field of Classification Search
CPC ....... B32B 21/042; B32B 21/04; B32B 21/13; B32B 21/14; B32B 3/02; B32B 3/14;
(Continued)

(56) References Cited

U.S. PATENT DOCUMENTS 126,617 A * 5/1872 Wyckoff .................. 404/42
191,194 A * 5/1877 Stow ....................... 404/46
(Continued)

OTHER PUBLICATIONS

Canadian Office Action dated Mar. 23, 2016 from corresponding Canadian Application No. CA 2,882,846, 4 pages.

*Primary Examiner* — Theodore V Adamos
(74) *Attorney, Agent, or Firm* — Ohlandt, Greeley, Ruggiero & Perle, LLP

(57) ABSTRACT

A composite reinforced hybrid wood floor for cargo-carrying truck trailers, truck bodies, and containers is provided. Two or more different types of woods are mixed in a controlled manner, arranged in a pattern and glued together to form hybrid wood board and a fiber/polymer composite layer is bonded to the underside of the hybrid wood board to form the composite reinforced hybrid wood floor boards provided herein. The composite reinforced hybrid wood floor provides weight reduction and/or cost savings as compared with a conventional composite wood floor made of a single type of wood, such as oak or hard maple.

10 Claims, 8 Drawing Sheets

(51) Int. Cl.
*B32B 7/12* (2006.01)
*B32B 21/04* (2006.01)
*B32B 27/20* (2006.01)
*B32B 25/20* (2006.01)
*B62D 25/20* (2006.01)

(52) U.S. Cl.
CPC .......... *B32B 27/20* (2013.01); *B62D 25/2054* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/101* (2013.01); *B32B 2262/103* (2013.01); *B32B 2262/106* (2013.01); *B32B 2439/00* (2013.01); *B32B 2605/00* (2013.01); *Y10T 428/24769* (2015.01)

(58) Field of Classification Search
CPC ....... B32B 7/12; B32B 27/20; B32B 2605/00; B32B 2262/0253; B32B 2262/0261; B32B 2262/0269; B32B 2262/0276; B32B 2262/0284; B32B 2262/101; B32B 2262/103; B32B 2262/106; B32B 2439/00; E04F 15/04; E04F 15/045; E04F 15/16; E04F 15/166; B62D 25/2054; Y10T 428/24769
USPC ........... 52/390, 588.1, 82.1; 428/50; 404/46; 296/184.1, 187.08, 193.07
See application file for complete search history.

(56) References Cited

U.S. PATENT DOCUMENTS

| | | | | |
|---|---|---|---|---|
| 2,037,259 | A | * | 4/1936 | Murphy et al. .................. 52/313 |
| 4,191,797 | A | * | 3/1980 | Hayward ........................ 428/50 |
| 5,040,582 | A | * | 8/1991 | Hsu ................................ 144/348 |
| 5,117,603 | A | * | 6/1992 | Weintraub ....................... 52/390 |
| 5,234,747 | A | * | 8/1993 | Walser et al. ................. 428/215 |
| 5,985,398 | A | * | 11/1999 | Bellegarde ...................... 428/54 |
| 6,318,794 | B1 | * | 11/2001 | Berube .................. B32B 21/08 296/181.2 |
| 6,601,357 | B2 | * | 8/2003 | Tunis ............................. 52/480 |
| 8,123,299 | B2 | * | 2/2012 | Lin ............................. 297/411.2 |
| 2001/0003623 | A1 | * | 6/2001 | Padmanabhan et al. .. 428/479.6 |
| 2005/0123728 | A1 | * | 6/2005 | Reichwein et al. ........... 428/192 |
| 2006/0179733 | A1 | * | 8/2006 | Padmanabhan ......... B32B 21/08 52/177 |
| 2007/0193179 | A1 | | 8/2007 | Risi |
| 2007/0218244 | A1 | * | 9/2007 | Mak ................................ 428/98 |
| 2009/0102232 | A1 | * | 4/2009 | Risi ............................. 296/184.1 |
| 2009/0218249 | A1 | * | 9/2009 | Stalter ........................ 206/524.2 |
| 2011/0045243 | A1 | * | 2/2011 | Dossche et al. ............. 428/141 |
| 2013/0014464 | A1 | * | 1/2013 | Risi ........................ B62D 29/02 52/592.1 |
| 2015/0064390 | A1 | * | 3/2015 | Gustafsson et al. ............ 428/77 |

* cited by examiner

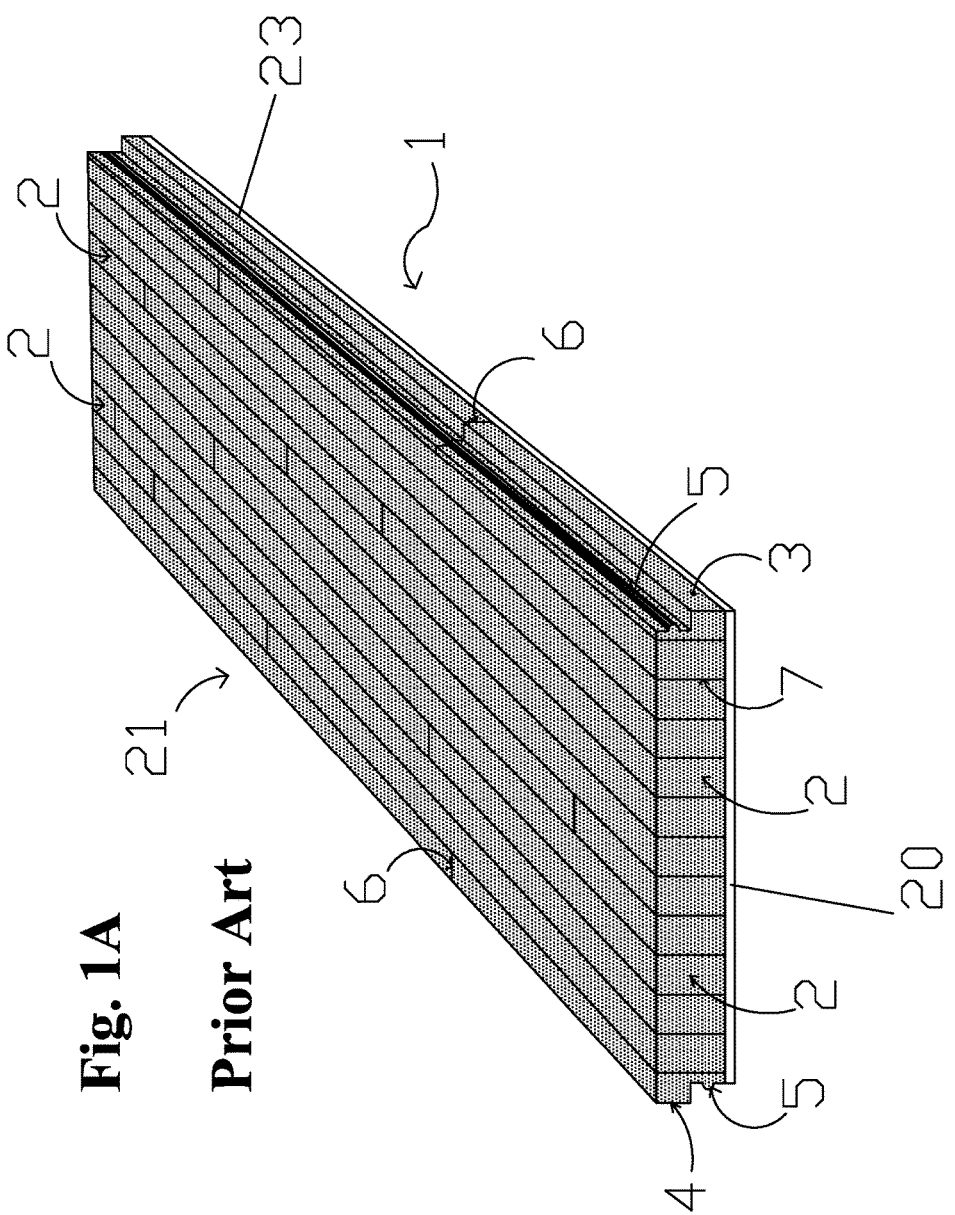

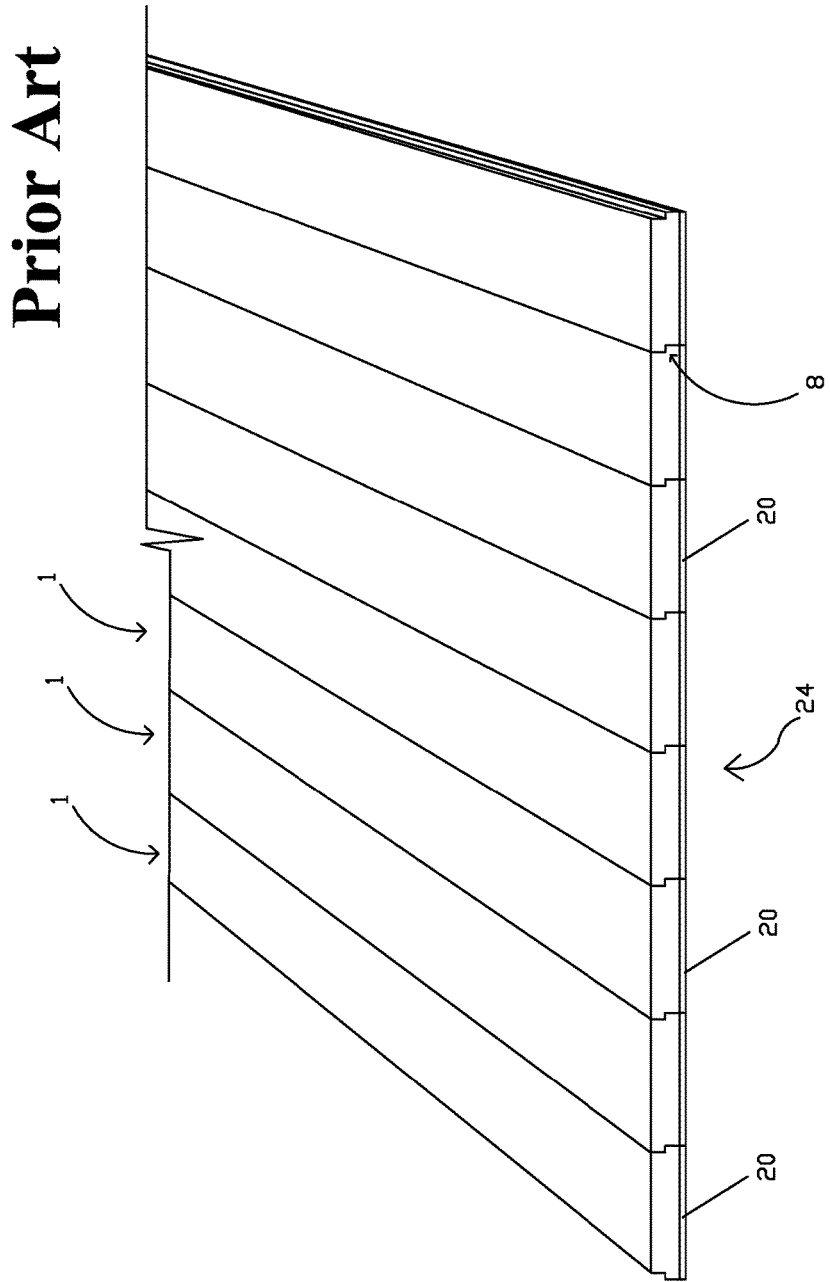

COMPOSITE REINFORCED HYBRID WOOD FLOOR WITH WOOD STRIPS ARRANGED IN A PATTERN FOR VEHICULAR TRAILERS

RELATED APPLICATION

This application claims the benefit of U.S. Provisional Application Ser. No. 61/944,048, filed on Feb. 24, 2014, which is incorporated herein by reference.

BACKGROUND OF THE DISCLOSURE

1. Field of Disclosure

The present disclosure relates to composite reinforced hybrid wood flooring for cargo-carrying truck trailers, truck bodies, and containers. The composite hybrid wood flooring has one or more portions having two or more types of wood strips, wherein the strips are arranged in a pattern and reinforced with fiber/polymer composite. The types of wood strips are selected to provide weight and cost savings over traditional composite wood flooring made of randomly arranged single type of wood such as oak (red and white) or maple (hard and soft). The composite hybrid wood flooring comprises one or more sections composed of a type of wood strips having an average specific gravity of 0.6 or higher and another type of wood strips with an average specific gravity less than 0.6, the specific gravity measured at 12 percent moisture content of wood and at least one type of wood strips are arranged in a pattern. The fiber/polymer reinforcement is a composite of any fiber such as glass, carbon, aramid, steel and any thermosetting or thermoplastic polymer such as epoxy, polyester, vinyl ester, phenolic, polypropylene, nylon, polyethylene terephthalate (PET), and the like.

2. Description of Related Art

Conventional wood flooring for over-the-road closed van trailers, truck bodies and containers is normally manufactured with hardwoods, such as oak, maple, birch, beech, ash, and the like. The green lumber used as a starting material in such manufacture is suitably dried to about 8% moisture content in special drying chambers under controlled, conditions or by air drying followed by kiln drying. The dried lumber is then sawed into strips of rectangular cross-section and defective portions are eliminated by cross cutting the strips. During the cross-cutting process, "hooks" are formed at the ends of the lumber strips. Alternatively, other shapes such as fingers, bevel, tongue, groove, and the like, may be incorporated at the strip ends to make suitable joints in the floor. These shapes are primarily designed to form a connection or joint between ends of strips with or without an adhesive. The relatively defect-free lumber strips are coated on their vertical sides or edges with an adhesive such as melamine formaldehyde or polyvinyl acetate. The glue coated lumber strips are then assembled on a conveyor by placing them side to side and behind other strips, which were previously assembled to form rows of wood strips. The adhesive is cured by applying heat and pressure to large sections of the assembled lumber strips thus forming a unitary panel. During the assembly of the lumber strips, "end-joints" are formed at the ends of the strips with hook, finger, bevel, tongue or groove shaped ends. These joints are usually simple mechanical couplings with no significant adhesive bonding. Glue or sealant may be applied at the ends of sticks to provide adhesive bonding and sealing at the end joints.

The glued laminated wood is cut to a desired length (up to about 60 feet) and width (about 6 to 18 inches) to form floorboards. Most boards are 10 to 13 inches wide, and about 20 to 53 feet in length. The boards are then planed to a desired thickness and shiplaps and crusher beads are machined at the longitudinal edges of the boards. A shiplap is a rectangular projecting lip running along the length at an edge of a floorboard. Typically, the lip extends along the width of a board by about ⅜" to ½" and has about half the thickness of the board. A "top shiplap" has the lip extending from the top half thickness of the board. Similarly, a "bottom shiplap" has the lip at the bottom half of the board. The crusher bead is a small semi-circular projection running along the length on the edge of a board and placed over or below a lip. When the floorboards are assembled in a trailer such that the side edges of corresponding boards are squeezed together, the top and bottom shiplaps of adjacent boards overlap to form a seam or shiplap joint. The shiplap joint between adjacent boards helps to transfer some of the load from one board to its adjacent board. The board joint also helps to prevent the entry of road debris and water into the trailer. The crusher beads provide spacing between adjacent boards and help in preventing buckling of the boards due to expansion of board on absorption of moisture. Wood putty is applied at the end joints of strips on the top and bottom surfaces of the boards to fill any resident gaps. Finally, the underside and lateral sides of the floor boards are coated with a water-based latex polymeric coating, which is generally referred to as "undercoating" or "board coating" to provide moisture protection. The coating is usually applied by spraying. The boards may also be treated with a fungicide, wax coating, top coating, sealer coating or other polymeric coating to improve their service performance. The finished floorboards are packaged as kits, by stacking one board on top of another, with about eight boards per kit for installation in over-the-road trailers, truck bodies and containers, herein generally referred to as "trailers". Normally, a kit consists of two boards with special edge profiles so that they will fit along the road and curb sides of a trailer. The other boards may be identical in design and they are placed between the road-side and curb-side boards. All the boards are supported by thin-walled cross-members of 1, C or hat sections, each having an upper flange, which span the width of the trailer and are spaced along the length of the trailer. Each floor board is secured to the cross-members by screws extending through the thicknesses of the board and the upper flanges of the cross-members.

Oak and hard maple hardwood-based laminated wood flooring is popularly used in truck trailers since it offers many advantages. The surface characteristics of these hardwoods such as high wear resistance and traction are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and ability to absorb small amounts of water, oil or grease without significantly affecting traction are yet additional favorable properties of hardwood flooring.

Fruehauf Corporation quality standard is well known in the trailer industry as the developer of standards for traditional hardwood flooring. This standard has been broadly adopted in the industry by various trailer and flooring manufacturers. This standard specifies that "Species of lumber shall be as listed below with mixture of specie between categories not permitted. Lumber shall be quarter sawn with appropriate minimum specific gravity of 0.6 at 12 percent moisture content." Further, the standard specifies that Category 1 of the lumber shall be white and red oak; Category 2 shall be pecan and hickory or pecan, hickory, beech, birch, locust and elm; and Category 3 shall be hard maple. It is known in the industry that typical maple flooring may comprise a mixture of hard and soft maple strips even though the soft maple is not permitted. Soft maples typically have a specific, gravity less than 0.6. Maple floors can have a mix of hard and soft maple strips, but it is difficult to visually differentiate the two types of wood strips for the common person. It requires the assistance of skilled technicians well versed with characteristics of wood species to visually identify the maple specie in a quick manner. Therefore, during production of maple flooring, the various maple strips are randomly mixed in the floor boards by typical workers in the flooring plant without consideration to develop any pattern of the strips in the floorboard based on their characteristics. Similarly, red and white oak are randomly mixed to make oak flooring for trailers because they are not easy to differentiate in the fast paced production environment.

Padmanabhan et at (U.S. Pat. No. 5,928,735) teach the composite wood flooring comprising laminated hardwood floor boards made with edge-glued hardwood strips and reinforcing the underside of the wood boards with fiber/polymer composite materials to reduce weight and to increase the strength of the traditional hardwood floor boards for trailer flooring. The transportation industry prefers to reduce the weight of the trailer to improve the efficiency of operation and to further lower the cost of the flooring. Hence there is a need for less costly and lower weight composite wood flooring for trailers and containers.

SUMMARY OF THE DISCLOSURE

The goal of the present disclosure is generally to provide weight reduction and/or to lower the cost of trailer floor compared to the same attributes of composite wood floor of the prior art (U.S. Pat. No. 5,928,735). To achieve this goal, two or more different types of woods are mixed in a controlled manner to make the inventive composite hybrid wood floor boards. Further, the different types of woods are selected such that there is a difference in the average density of the wood. By choosing a denser wood such as oak and lighter wood such as poplar or soft maple or both, the average weight of the floor can be reduced compared to a traditional oak composite floor. The cost of the composite hybrid wood floor can be reduced by using a less costly wood such as poplar in combination with a more costly wood such as oak compared to the cost of traditional oak composite floor of the prior art. Further, the wood types are chosen so that the general appearances of the types of wood or their color or grain or texture or any artificial marking applied to the strips can be identified by typical factory worker in order to assemble at least one type of wood strips in a regular pattern. Red and white oak look very similar to the untrained eye in a production or assembly environment and include dozens of sub-species of oak. Hard maple and soft maple are also difficult to distinguish easily by a typical factory worker during the wood strip assembly process at the time of laminating the strips of wood. Therefore, these types of commonly used woods strips are randomly mixed and irregularly arranged, to make traditional composite floor boards.

The term "hybrid wood board" or "hybrid, floor board" shall be understood to be a wood board comprising two or more types of wood strips in an area of the board, at least one type of wood strips having, generally distinguishable quality of color or grain or texture or appearance or any applied marking or average specific gravity compared to the other types of wood, wherein at least one type of wood strips are arranged in a pattern in the board. The term "composite hybrid wood board" or "composite hybrid floor board" or "composite reinforced hybrid wood floor board" or "composite hybrid board" is a hybrid wood board that is reinforced by a layer of fiber reinforced composite material. The term "composite hybrid wood floor" or "composite hybrid floor" is a floor comprising a plurality of composite hybrid wood boards assembled to form a floor with at least one composite hybrid wood board. Due to the readily distinguishable appearance of the selected, types of wood strips, the different wood strips can be assembled during laminating of the strips for floor production to create a pattern of rows of strips in the floor board. The term "pattern" shall be understood to be an arrangement of wood strips in an area of a hybrid floor board or a composite hybrid floor board measuring at least about three feet in length and any width of the floor board ranging from about six to about sixteen inches, the area comprising two or more types of wood strips, wherein one or more types of wood strips are in a regular or repeating arrangement.

A pattern can be such that a first type and a second type of wood stops are set in alternating rows, where the rows are side by side in a portion, of the composite hybrid floor board. The types of wood may be hardwoods and/or softwoods. Another arrangement can be such that the alternating rows of wood strips are in the middle of the composite hybrid board and the edges of the board have the same type of wood strips. Yet another arrangement can have double rows of a first type of wood strips alternating with double rows of a second type of wood strips. Even another arrangement can be alternating strips of a first type of wood and a second type of wood in the middle area of the board while the edges comprise multiple rows of the first type of wood. Further, another arrangement can be rows of a first type of wood in the middle area of the board forming distinctly identifiable ribs, whereas the remaining strips are any other wood.

In this disclosure, the wood types to be mixed have easily distinguishable color or grain or texture or appearance or any applied marking or average specific gravity so that the mixing of the wood components can be suitably controlled during factory production of hybrid floor boards. Examples of such combinations of woods include, but are not limited to the combinations of red oak-poplar, white oak-poplar, mixed oak-poplar, red oak-soft maple, white oak-soft maple, mixed oak-soft maple, oak-birch, oak-beech, hickory-poplar and the like. Another example of wood combinations includes a first type of wood such as oak and a second type of wood such as a mix of soft maple, poplar, and birch. Combination of oak (red, white, or mixed oak) and poplar has a distinct advantage when making trailer flooring, which is an inventive subject matter. Roth are hardwoods and their lumber boards are made, graded and sold similarly by sawmills and the prices for oak and poplar are significantly different for the same grade of lumber. Both are available in plentiful quantities, which makes it easy to source these two types of lumber in large and economical quantities for making trailer flooring. In addition, suitable lower density softwoods such as pine, fir, spruce, hemlock, larch or other softwoods can be used with higher density hardwoods to make a pattern in the hybrid wood floorboard.

The hybrid wood boards are further reinforced with a fiber/polymer composite layer. The composite layer is bonded to the underside of the hybrid wood board with a suitable adhesive such as epoxy or polyurethane. The fiber/polymer composite layer is a composite of one or more kinds of reinforcing fibers such as glass, carbon, aramid, steel and thermosetting or thermoplastic polymers such as epoxy, polyester, vinyl ester, phenolic, polypropylene, nylon, PET, and the like.

BRIEF DESCRIPTION OF THE DRAWINGS

FIG. 1A is a portion of a traditional composite reinforced wood floor board (prior art) having one or more types of wood strips in random arrangement and a reinforcing composite layer bonded to the underside of traditional wood board.

FIG. 1B is a portion of a traditional composite reinforced wood floor in a trailer (prior art), wherein the floor comprises a plurality of composite floor boards assembled side-by-side by means of shiplap joint between adjacent boards.

DETAILED DESCRIPTION OF THE DISCLOSURE

Figure 2:
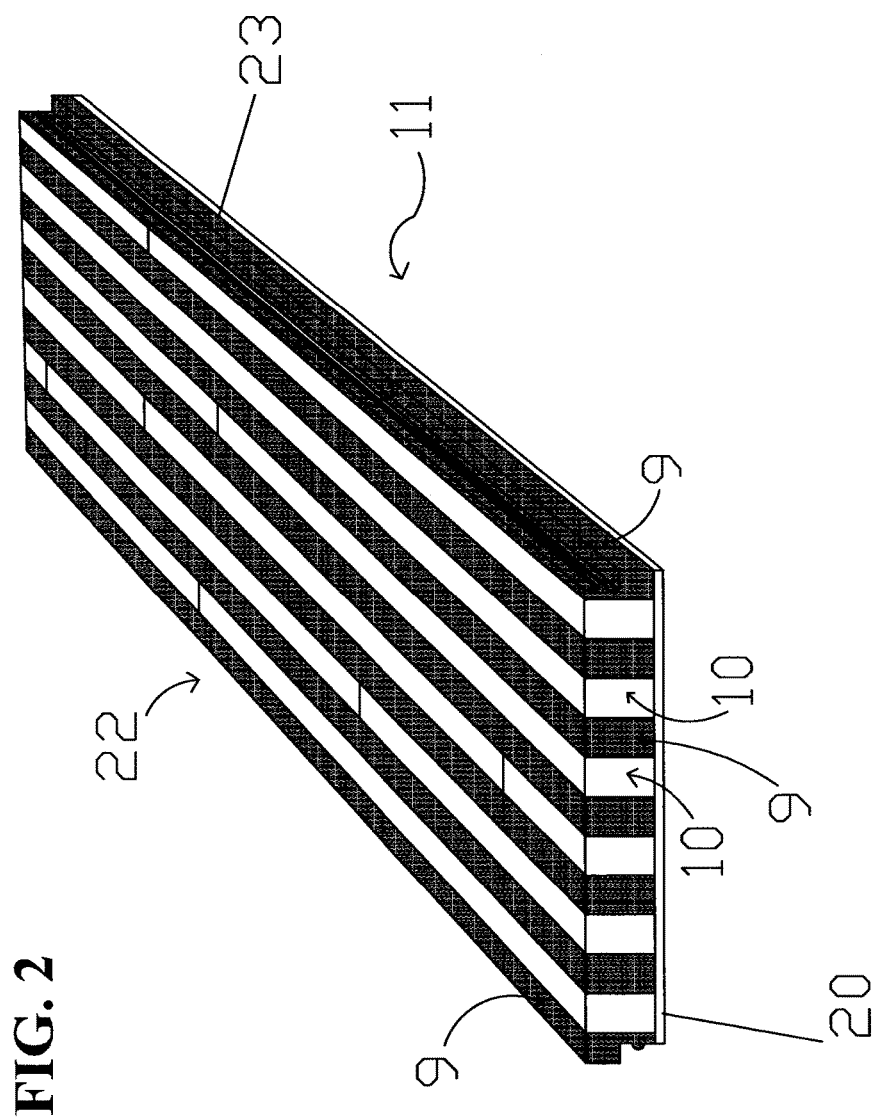
FIG. 2 is a portion of a composite reinforced hybrid wood floor board having two types of wood strips in alternating pattern of rows and the same type of wood strips at the edges of board and a reinforcing composite layer bonded to the underside of hybrid wood board.

Referring to FIG. Iowa, traditional composite reinforced wood floor board or composite floor board or composite wood board 1 for over-the-road truck trailers and containers is normally manufactured with hardwoods such oak, maple, birch, beech and the like, although softwoods such as pine. Douglas fir, hemlock, larch and spruce can be employed. A composite wood floor board is composed of many wood strips 2 forming an upper layer of wood or wood board 21, each strip with a length less than about 10 feet. The wood strips are edge-glued to form a unitary wood board measuring 6 to 18 inches wide and up to about 60 feet in length. The ends of the wood strips are shaped in the form of a hook, butt, finger or other mechanical or adhesive joint to make a longitudinal connection or end-joint 6 with other strips at the front end and back end of the wood strips.

A shiplap 3, 4 is a rectangular projecting lip running along the length at an edge of a floorboard. Typically, the lip extends along the width of a board by about ⅜" to ½" and has approximately half the thickness of the board. A "top shiplap" 4 has the lip extending from the top half thickness of the board. Similarly, a "bottom shiplap" 3 has the lip at the bottom half of the board. The crusher bead 5 is a small semi-circular projection running along the length of an edge of a board and placed above or below a lip. A typical floor board can have about eight to about fourteen rows of wood strips adjacent to one another across the width of the board. A glue joint 7 is present between the adjacent rows of strips of wood.

A fiber/polymer composite layer 20 is bonded to the underside of the wood layer or wood board 21 with a suitable adhesive 23. The composite layer is a composite of one or more kinds of reinforcing fibers such as glass, carbon aramid, steel and thermosetting or thermoplastic polymers such as epoxy, polyester, vinyl ester, phenolic, polypropylene, nylon, PET, and the like.

Referring to FIG. 1B, when the composite floor boards 1 are assembled side-by-side in a trailer to make a composite wood floor 24, such that the side edges of corresponding boards are squeezed together, the top and bottom shiplaps of adjacent boards overlap to form a seam or a shiplap joint 8. The shiplap joint between adjacent boards helps to transfer some of the load from one board to the adjacent board. The crusher beads provide spacing between adjacent boards and help to prevent the buckling of the boards due to expansion on absorption of moisture by wood. Putty is applied at the end-joints 6 of wood strips of the boards to fill any resident gaps. All the boards are supported by thin-walled cross-members of 1, C or hat sections in a trailer, each cross-member having an upper flange, which span the width of the trailer and are spaced along the length of the trailer. Each floor board is secured to the cross-members by screws extending through the thicknesses of the board and the upper flanges of the cross-members.

Commercially available traditional maple floor boards can have a mix of hard and soil maple strips. It is difficult to visually differentiate the two types of maple wood strips for the common person or typical factory worker in a quick manner. It requires the assistance of skilled technicians well versed with the characteristics of wood species to identify hard and soft maple wood types. Therefore, during the production of maple floor boards, the various types of maple strips are randomly mixed in the floor boards by typical workers in the flooring plant without consideration to develop any pattern of the strips in the floorboard based on their characteristics. Similarly, red and white oak are randomly mixed to make traditional oak floor boards for trailers because they are not easy to differentiate in the fast paced production environment. Traditional wood floor board 21 for trailers may also be made with one type of wood such as hard maple, red oak or white oak only.

The goal of the present disclosure is generally to provide weight reduction and/or to reduce the cost of a reinforced floor board compared to the traditional composite wood floor board 1, which is made of wood board 21 with red or white oak or both red and white oak or maple. A composite layer 20 is bonded to the underside of the traditional wood board 21 by an adhesive 23. To achieve this goal, referring to FIG. 2, two or more different types of woods are mixed in a controlled manner to make the inventive composite hybrid wood floor board 11. The composite hybrid wood floor board has an upper layer of hybrid wood board 22 and a bottom layer of a fiber/polymer composite layer 20. The composite layer 20 is bonded to the underside of the hybrid wood board 22 by an adhesive 23.

The hybrid wood board 22 comprises two or more types of wood. Further, the different types of woods are selected such that there is a difference in the average density of the wood types. By choosing, a denser wood such as oak and lighter wood such as poplar or soft maple or both, the average weight of the floor can be reduced compared to a traditional oak composite floor. The cost of the floor board can be reduced by using a less costly wood such as poplar in combination with a more costly wood such as oak compared to the cost of traditional oak composite floor board. Further, the wood types are chosen so that the general appearances of the types of wood or their color or grain or texture or appearance or any applied marking can be identified by typical factory worker making the inventive composite hybrid wood floor and floor board. Red and white oak look very similar to the untrained eye in a production or assembly environment and they include dozens of sub-species. Hard maple and soft maple are also difficult to distinguish easily by a typical factory worker during the wood strip assembly process at the time of laminating the strips of wood. Therefore, these types of woods strips are randomly mixed and irregularly arranged to make traditional composite floor board 1.

The term "hybrid wood board" or "hybrid-wood board", or "hybrid floorboard" or "hybrid floor board" shall be understood to be a wood board comprising two or more types of wood strips in an area of the board, at least one type of wood strips having generally distinguishable quality of color or grain or texture or appearance or any applied marking or average specific gravity compared to the other types of wood, wherein at least one type of wood strips are arranged in a pattern in the board.

The term "composite hybrid wood board" or "composite hybrid floor board" or "composite reinforced hybrid floor board" or "composite hybrid board" is a hybrid wood board that is reinforced by a layer of fiber reinforced composite material. The term "composite hybrid wood floor" or "composite hybrid floor" is a floor comprising a plurality of composite hybrid wood boards assembled to form a floor with at least one composite hybrid wood board. Due to the readily distinguishable appearance of the selected types of wood strips, the different wood strips can be assembled during laminating of the strips for floor production to create a pattern of rows of strips in the floor board. The term "pattern" shall be understood to be an arrangement of wood strips in an area of a hybrid, floor board or a composite hybrid floor board measuring at least about three feet in length and any width of the floor board ranging from about six to about sixteen inches, the area comprising two or more types of wood strips, wherein one or more types of wood strips are in a regular or repeating arrangement.

A pattern can be such that a first type and a second type of wood strips are set in alternating rows, where the rows are side by side in a portion of the composite hybrid floor board. The types of wood may be hardwoods and/or softwoods. Another arrangement can be such that the alternating rows of wood strips are in the middle of the composite hybrid board and the edges of the board have the same type of wood strips. Yet another arrangement can have double rows of a first type of wood strips alternating with double rows of a second type of wood strips. Even another arrangement can be alternating strips of a first type of wood and a second type of wood in the middle area of the board while the edges comprise multiple rows of the first type of wood. Further, another arrangement can be rows of a first type of wood in the middle area of the board forming distinctly identifiable ribs, whereas the remaining strips are any other wood.

In this disclosure, the wood types to be mixed have easily differentiable color or grain or texture or appearance or any applied marking or average specific gravity so that the mixing of the wood components can be suitably controlled during factory production of hybrid floor boards. They may be hardwoods and/or softwoods. Examples of such combinations include, but are not limited to the combinations of red oak-poplar, white oak-poplar, mixed oak-poplar, red oak-soft maple, white oak-soft maple, mixed oak-soft maple, oak-birch, oak-beech, hickory-poplar and the like. Another example of wood combinations includes a first type of wood such as oak and a second type of wood such as a mix of soft maple, poplar, and birch. Oak (red, white, or mixed oak) and poplar combination has a distinct advantage when making trailer flooring, which is an inventive subject matter. Both oak and poplar are hardwoods and their lumber boards are made, graded and sold similarly by sawmills and the prices for oak and poplar are significantly different for the same grade of lumber. Both hardwoods are available in plentiful quantities, which makes it easy to source these two types of lumber in large and economical quantities for making trailer flooring. In addition, suitable lower density softwoods such as pine, fir, spruce, hemlock or larch or other softwoods can be used with other higher density hardwoods to make a pattern in the floorboard.

Table 1 below is a list of green (not dry) lumber prices published by Hardwood Market Report dated Jan. 3, 2014. The grade chosen for this comparison is #2A or #2A Com or 2Com, which is typically used for making trailer flooring for economic reasons. The thickness of the lumber considered here is 4 quarter (4/4), which is readily available at the actual thickness of 1.0 to 1.12 inch in the tin-dried or green stage. A board foot (bdft) of lumber is a volumetric measure of lumber having a surface area of 1 square foot and thickness of 4 quarter. The sawmill price is normally quoted for a thousand (1000) board foot. The market prices vary based on region and the demand for lumber, but this table provides a general comparison among hardwoods.

TABLE 1

Prices for Grade #2A Lumber (Appalachian Region)

| Type | Price per thousand bdft (Mbdft) | Specific Gravity |
| --- | --- | --- |
| Ash | $350 | 0.49-0.6 |
| Beech | $345 | 0.64 |
| Birch | S315 | 0.55-0.65 |
| Hickory | $520 | 0.60-0.75 |
| Hard Maple | $765 | 0.57-0.63 |
| Soft Maple | $410 | 0.47-0.54 |
| Red Oak | $700 | 0.59-0.69 |
| White oak | $660 | 0.63-0.88 |
| Poplar | $355 | 0.42 |

It is clear from Table 1 that ash, beech, birch, soft maple, and poplar are significantly less costly than hard maple, hickory, red oak and white oak. A lower cost floor can be produced by using oak (red, white or both) with another type of wood such as poplar, for example. Other combinations of different types of woods are possible to lower average cost of materials.

According to the Wood Handbook—Wood as an Engineering Material, which is published by the USDA Forest Service, yellow-poplar, commonly referred to as poplar, has a specific gravity of 0.42 at 12 percent moisture content (see Table 1). Other properties for poplar, which are important to the performance of this wood in trailer flooring application, are discussed below at the same 12 percent moisture content. Poplar has a modulus of rupture (MOR), which is also known as bending strength of 10,100 pounds per square inch (psi). The modulus of elasticity (MOE), which is also known as bending modulus is 0.58 million psi for poplar. The side hardness of poplar is 540 pounds. Compared to poplar, oaks are classified into red and white oaks and further, each group of oak has several sub-types or sub-species. The specific gravity of oak ranges between 0.59 to 0.88. Southern red oak, which has the low specific gravity of 0.59 and live oak, which has a high specific gravity of 0.88 are less commonly used for making trailer floors. However, chestnut, among other oaks, is a commonly used oak for making trailer floors and therefore it is used here as an example for comparison with poplar. The specific gravity of chestnut oak is 0.66, MOR is 13,300 psi, MOE is 1.59 million psi and side hardness is 1130 pounds. The resistance of wood screw shanks to withdrawal from the side grain of seasoned wood varies directly with the square of the specific gravity of the wood. Screw withdrawal resistance is a useful property for properly attaching, the floorboard to the cross-members of the trailer.

Random mixing and irregular patterning of a lighter, weaker and softer (having lower side hardness) type of hardwood strips such as poplar with a heavier, stronger and harder type of hardwood strips such as chestnut oak or other oaks to make trailer floor can produce a board with widely varying characteristics, which is not suitable for use in trailers. Selective mixing of oak and poplar strips and creating a pattern of the rows of wood strips of two types of wood in the floorboard can overcome this problem. Laying the strips of oak and poplar in a pattern during assembly of wood strips for lamination or gluing can produce a hybrid floor board with more controllable characteristics and desirable aesthetic qualities. The lower hardness of poplar strips can be offset by the higher hardness of oak strips by means of forming a pattern with the rows of oak and poplar strips. The ability to produce a hybrid floorboard by selective mixing of wood types and making a pattern of wood strips to reduce variation in unit weight (weight per square foot of floor board) or strength or resistance to indentation is one of the inventive embodiments disclosed herein.

The cost of producing a hybrid, floor board is lower than producing a traditional floorboard with hard maple or oak. For example, #2A grade of oak (red and white) lumber is available for about $660 to $700 per thousand board feet (Mbdft) in the Appalachian region, which leads to an average price of about $680. Poplar, which is a lighter wood than oak is available for about $355 per Mbdft in the Appalachian region. The cost of transporting the lumber can be lower for poplar because of its lower specific gravity than the oak. Further, cost savings are achieved due to fast drying characteristics of poplar, which means the flooring producer does not have to carry very large inventory of poplar to meet a surge in market demand. For example, it takes significant investment in drying warehouse and kilns to dry oak in about 60 days, whereas poplar can be dried in about 10 days due to its natural drying characteristics. By mixing oak and poplar lumber at the approximate ratio of 1 to 1, the average cost of lumber is $518 per Mbdft. The oak-poplar mix provides cost savings of about $163 per Mbdft of lumber used to make the hybrid flooring compared to traditional oak flooring. Approximately 24% reduction in cost of lumber can be achieved for the hybrid floorboard by mixing oak and poplar than the traditional oak floor. Further the weight of flooring can be reduced due to the lower specific gravity of poplar than oak. The unit weight of oak is about 3.9 pounds per bdft at about 8 percent moisture content, whereas the unit weight, of poplar is about 2.8 pounds per bdft at about the same moisture content. The hybrid oak-poplar boards with about similar proportion of oak and poplar weighs about 3.4 pounds per bdft.

Mixing hard maple and soft maple provides cost advantage compared to using just using hard maple to make trailer flooring. Hard and soft maples are difficult to differentiate for a typical factory worker in the production environment and therefore they are randomly mixed, which can lead to concentrated pockets of one type of lumber. The floorboard cart have high concentration of soft maple in some parts of the flooring, which is not desirable. The sections of floorboard with a higher concentration of the soft maple can have lower strength and lower mechanical properties than a section of the floorboard that has a high concentration of hard maple. The higher mechanical properties of hard maple are generally correlated to the higher density of this type of wood compared to soft maple.

Mixing birch and oak provides cost advantage, but random mixing of the wood strips in irregular pattern can lead to larger variations of the strength, appearance and wear or surface indentation characteristics of the floor. It is preferable to have lower level of variations in the properties of the floor boards for trailer flooring application. The inventive way to achieve lower variation and a higher degree of uniformity of the floor properties across a section of the floor board is by arranging the dissimilar types of wood in a pattern to form the hybrid floor board. The ability to visually differentiate oak and birch strips in the production assembly stage to make a pattern of strips and produce flooring with selective, more controllable and relatively more uniform characteristics, such as the strength, bending modulus, unit weight of floorboard and appearance is an advantage. Similarly, oak and soft maple can be mixed to make a pattern in the hybrid floorboard and to reduce cost and derive less variation in the properties. The hybrid wood boards are further reinforced with a fiber/polymer composite layer. The composite layer is bonded to the underside of the hybrid wood board with a suitable adhesive such as epoxy or polyurethane. The fiber/polymer composite layer is a composite of one or more kinds of reinforcing fibers such as glass, carbon, aramid, steel and thermosetting or thermoplastic polymers such as epoxy, polyester, vinyl ester, phenolic, polypropylene, nylon, PET, and the like.

An inventive matter disclosed herein is the composite reinforced hybrid wood board having two types of wood strips arranged in a pattern and the cost of one type of wood strips is at least about 10% lower than the cost of the second type of wood strips. Another inventive matter disclosed herein is the composite reinforced hybrid wood board having two types of wood strips arranged in a pattern and the average specific gravity of one type of wood is at least about 5% lower than the average specific gravity of the second type of wood strips. Alternatively, the composite hybrid wood flooring comprises one or more sections composed of a type of wood strips having an average specific gravity of 0.6 or higher and another type of wood strips with an average specific gravity less than 0.6, the specific gravity measured at 12 percent moisture content of wood and at least one type of wood strips are arranged in a pattern.

One of the particular inventive matters disclosed herein is the selective mixing and patterning of poplar and oak strips in a composite hybrid wood floor board. These wood strips can be easily identified by the typical factory worker engaged in the assembly of the oak and poplar wood strips to make a floor board. Ability to identify the wood strips allows the workers to arrange the strips of wood in a desired pattern, which pattern is useful to control the mechanical properties or aesthetic quality or wear characteristics or installation of floor screws to attach the floorboard to cross-members of trailer. It is also possible to build composite hybrid wood boards where a first area of the board is composed of oak and poplar in a given pattern and another area is composed of oak only. Such an attribute is useful because the natural decay resistance and hardness or ability to resist indentation of oak is higher than poplar. The rear area of the trailer floor may be subjected to greater damage from moisture or water and by cargo-loading of the trailer by lift trucks. Composite hybrid wood floor with a rear area of oak is useful in this case.

FIG. 1A described above is a portion of a traditional composite wood floor board 1 (prior art) used in vehicular flooring having one or more types of wood strips in random arrangement in the wood board 21. The wood strips are typically red and white oak and these strips are mixed in any proportion in the oak floor board in any given area of the board. The red oak strips are not arranged in a set manner relative to the white oak. Red and white oaks are considered to be one type of wood for making trailer flooring. Sometimes, the oak floors are made with white oak only or red oak only. Maple floor boards are also used in trailers and they may comprise hard maple strips only. Soft maple and birch or another type of wood strip may be mixed with the hard maple strips in a random arrangement and in any proportion. Since hard maple, soft maple and birch have a similar appearance and not readily distinguishable for production scale assembly of strips, they are considered to be just one type of wood. FIG. 1B is a portion of a traditional composite wood floor 24 in a trailer, the floor comprising one or more traditional composite floor boards 1 assembled side by side means of shiplap joint 8 between adjacent boards.

The embodiments of this disclosure are described below and schematically represented in FIG. 2 to FIG. 7. FIG. 2 is a portion of a composite hybrid wood floor board 11 having two types of wood strips in alternating pattern of rows of strips and the same type of wood strip is used at the edges of hybrid wood board 22. A first type of wood strips 9 may be red oak or white oak or mixed oaks or hard maple or hickory or any combinations of them along several rows of strips. A second type of wood strips 10 along the rows in the alternating pattern with 9 may be poplar or birch or soft maple or ash or beech or a combination of them. The first type of wood strips has a higher average cost or a higher average density or both than the second type of wood strips. The hybrid wood board 22 is reinforced at the underside with fiber/polymer composite layer 20. The composite layer 20 is bonded to the hybrid wood board 22 by an adhesive 23.

Figure 3:
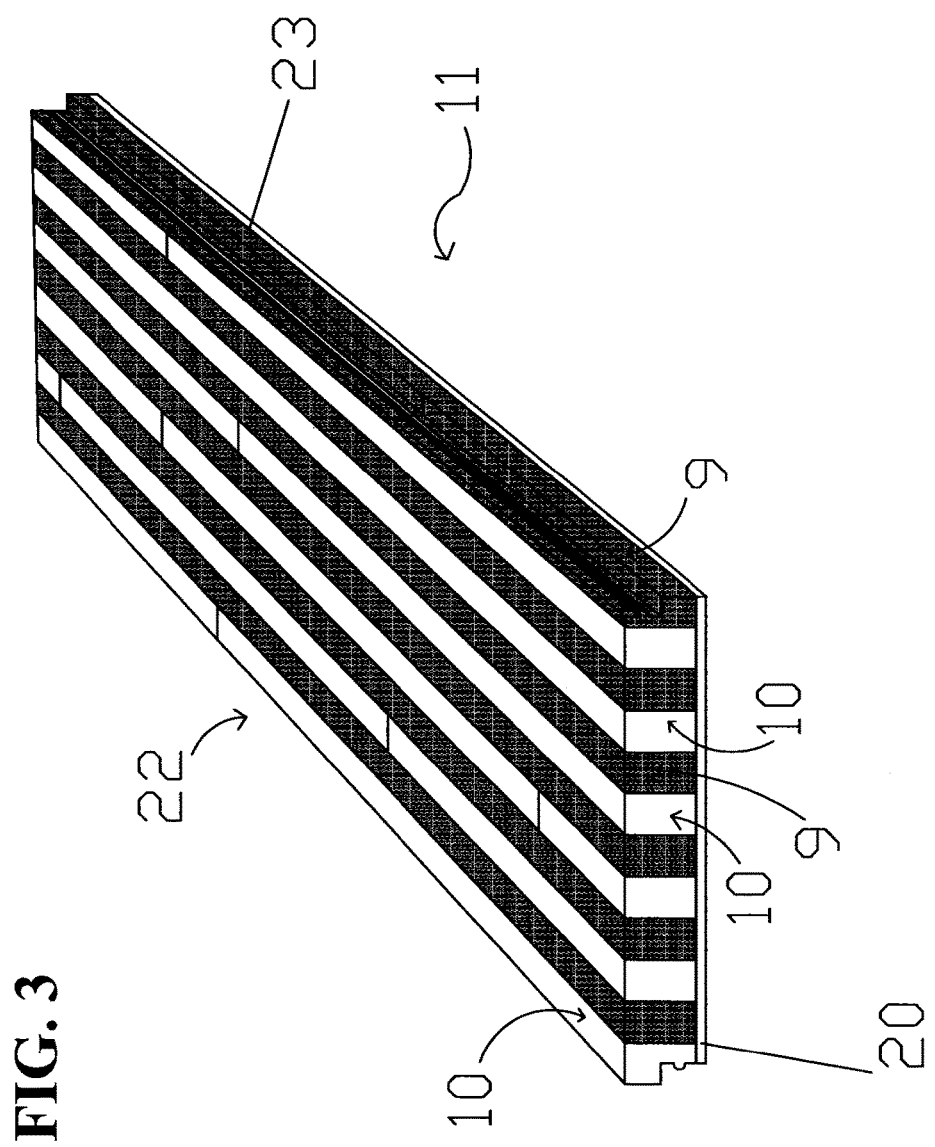
FIG. 3 is a portion of a composite reinforced hybrid wood floor board having two types of wood strips in alternating pattern of rows and two types of wood strips at the edges of board and a reinforcing composite layer bonded to the underside of hybrid wood board.

FIG. 3 is a portion of a composite hybrid wood floor board 11 having two types of wood strips in alternating pattern of rows of strips and dissimilar types of wood strips are at the edges of board. A first type of wood strips 9 may be oak or hard maple or hickory or a combination of them along rows of strips. Another type of wood strips 10 in the alternating pattern with 9 may be poplar or birch or soft maple or ash or beech or a combination of them. The first type of wood strips has a higher average cost or a higher average density or both than the second type of wood strips. The hybrid wood board 22 is reinforced at the underside with fiber/ polymer composite layer 20. The composite layer 20 is bonded to the hybrid wood board 22 by an adhesive 23.

Figure 4:
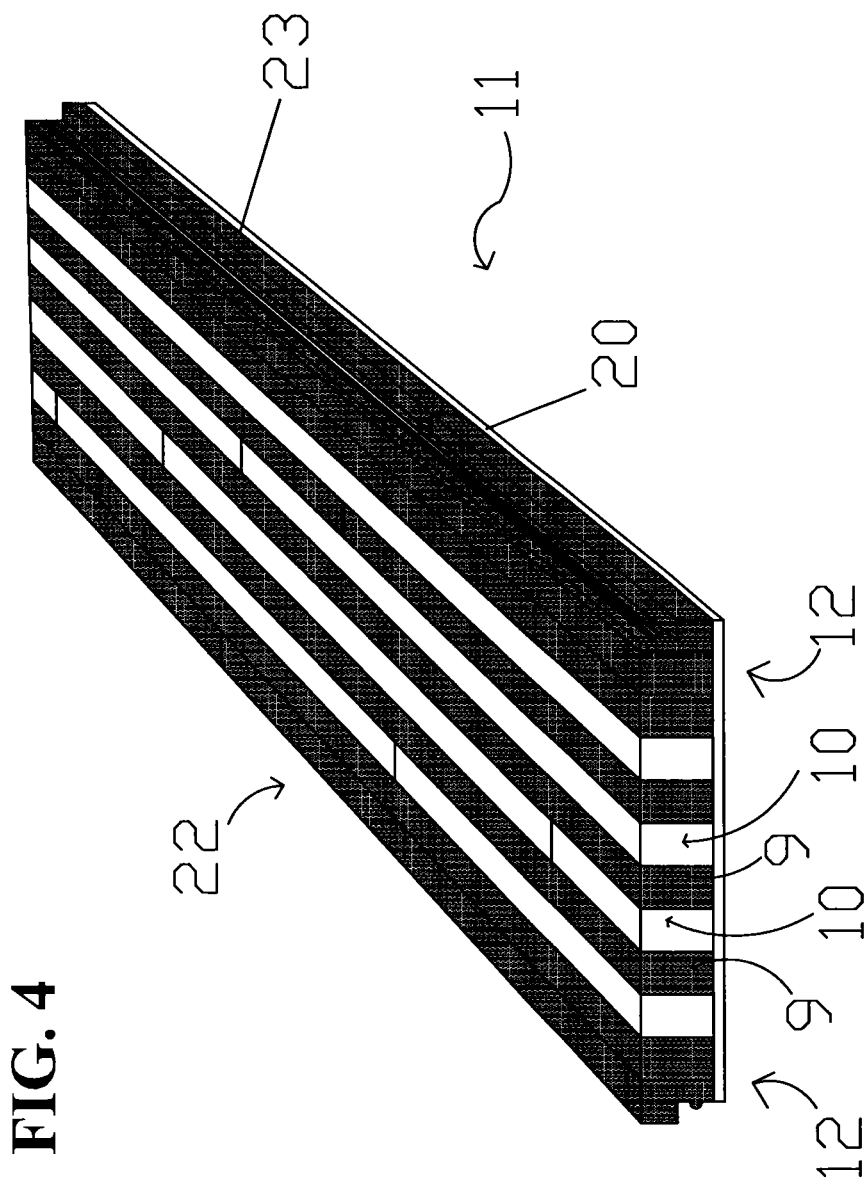
FIG. 4 is a portion of a composite reinforced hybrid wood floor board having two types of wood strips in alternating pattern of rows in the middle area of board and a plurality of the same type of wood strips at the edges of board and a reinforcing composite layer bonded to the underside of hybrid wood board.

FIG. 4 is a portion of a composite hybrid wood floor board 11 having two types of wood strips 9 and 10 in alternating pattern of rows of strips in the middle area of board and a plurality of rows 12 of same type of wood strips at the edges of hoard. The hybrid wood board 22 is reinforced at the underside with fiber/polymer composite layer 20. The composite layer 20 is bonded to the hybrid wood hoard 22 by an adhesive 23.

Figure 5:
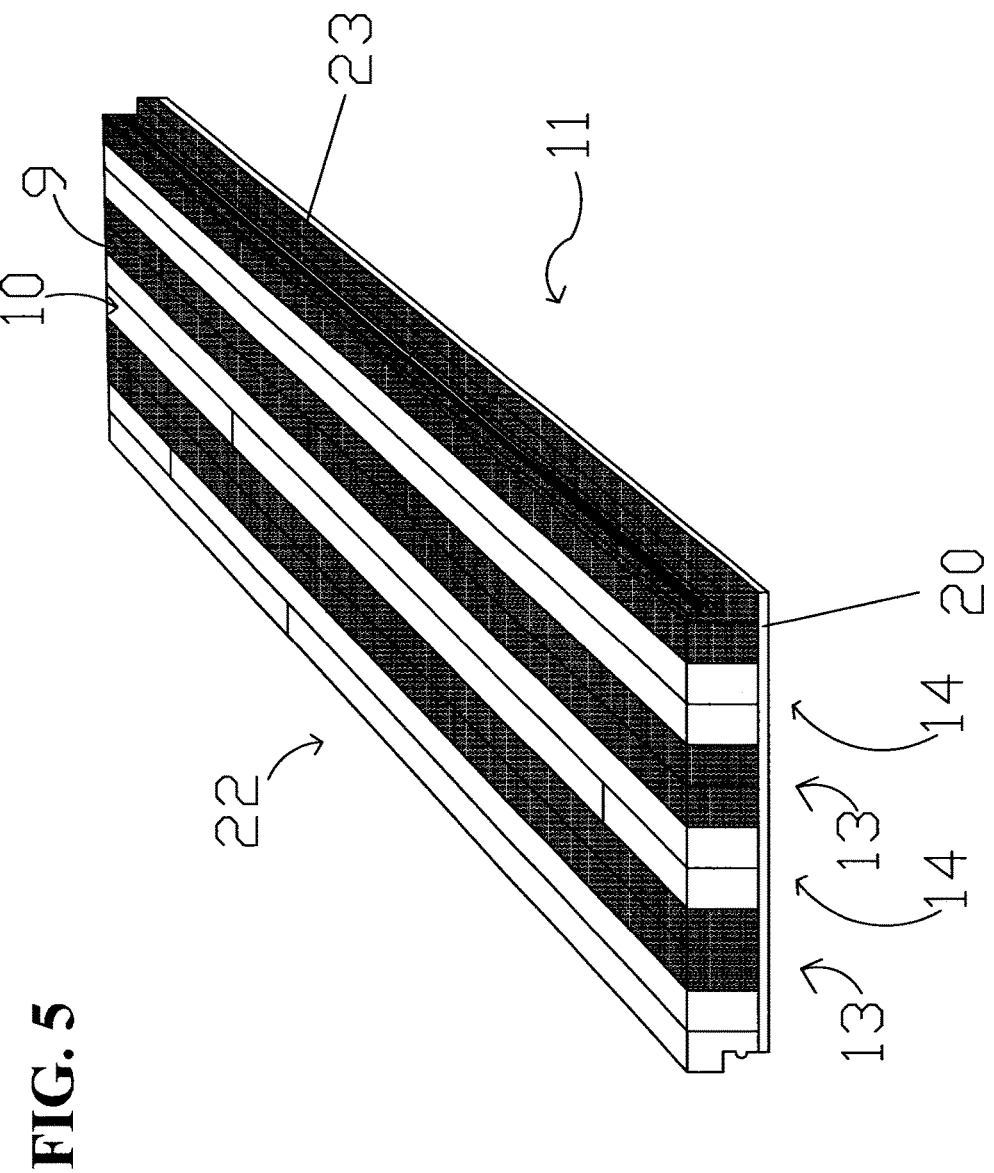
FIG. 5 is a portion of a composite reinforced hybrid wood floor board having two types of wood strips, wherein two adjacent rows of a first type of wood strips and two adjacent rows of a second type of wood strips are arranged in an alternating pattern and a reinforcing composite layer bonded to the underside of hybrid wood board.

FIG. 5 is a portion of a composite hybrid wood floor board 11 having a first and second types of wood strips and two adjacent rows of strips 13 of a first type of wood 9 and two adjacent rows of strips 14 of a second type of wood 10 are in alternating pattern at least in the middle area of board. The hybrid wood board 22 is reinforced, at the underside with fiber/polymer composite layer 20. The composite layer 20 is bonded to the hybrid wood board 22 by an adhesive 23.

Figure 6:
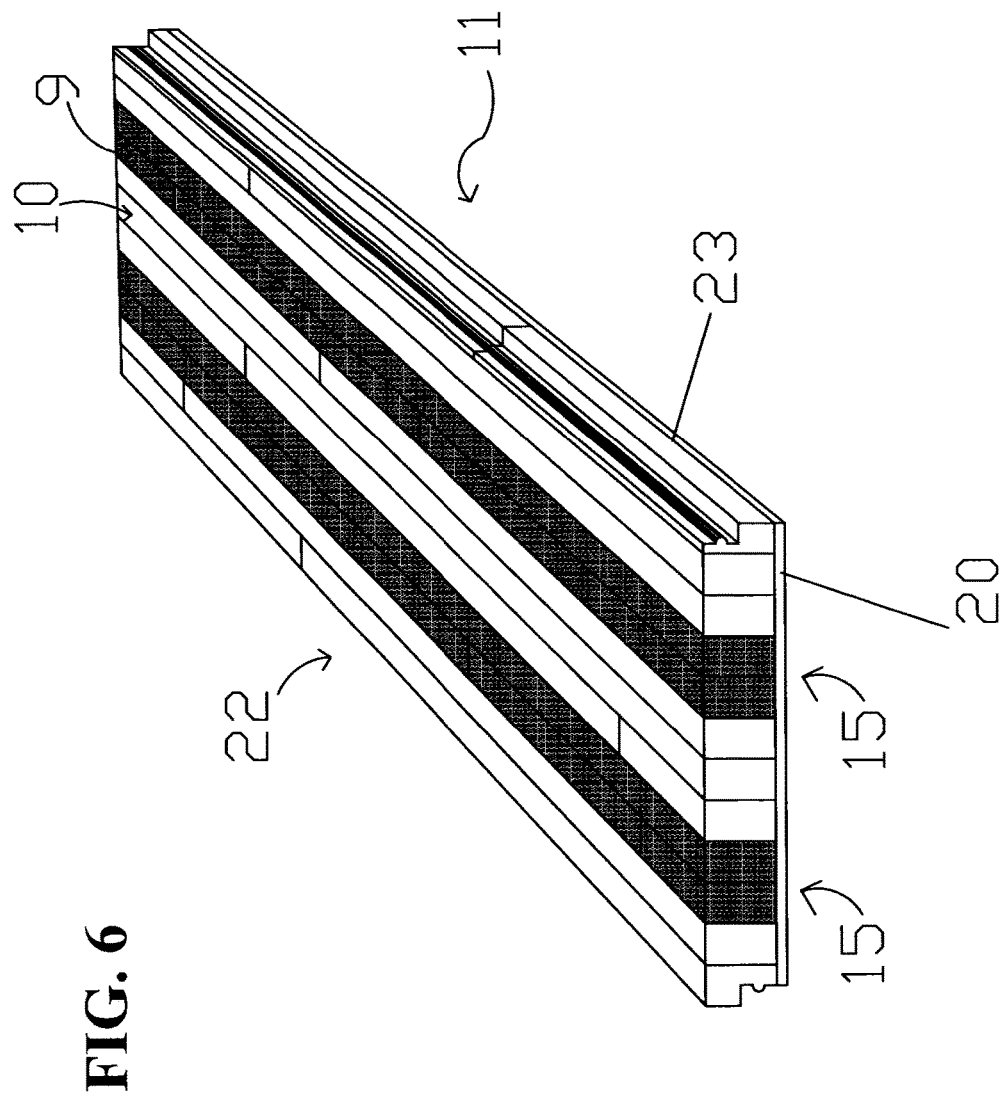
FIG. 6 is a portion of a composite reinforced hybrid wood floor board having two types of wood strips with one type of wood strips arranged to form one or more ribs in the middle area of the board and a reinforcing composite layer bonded to the underside of hybrid wood board.

FIG. 6 is a portion of a composite hybrid wood floor board 11 having a first and second types of wood strips and two or more rows of wood strips of the first type of wood 9 are arranged in a pattern to form ribs 15 in the middle area of the board and the ribs are adjacent to rows of strips of a second type of wood 10. The hybrid wood board 22 is reinforced at the underside with fiber/polymer composite layer 20. The composite layer 20 is bonded to the hybrid wood board 22 by an adhesive 23.

Figure 7:
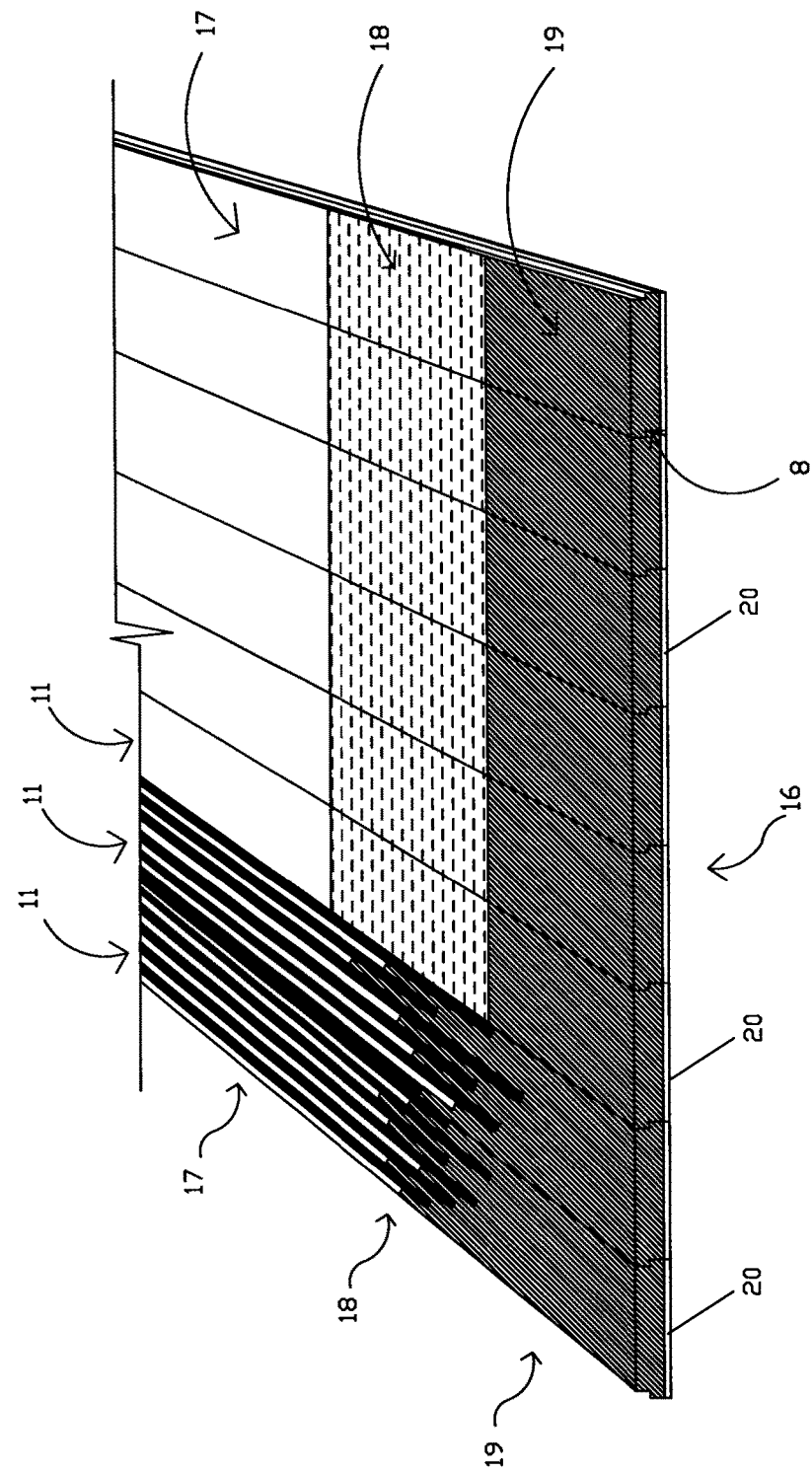
FIG. 7 is a portion of a composite reinforced hybrid wood floor in a trailer, wherein the floor comprises a plurality of reinforced hybrid hoards and at least one board has a first area, a second area and a third area; wherein the first area has two or more types of wood strips in a pattern, the second area is a transition area and the third area has a traditional arrangement of wood strips.

FIG. 7 is a portion of a composite hybrid wood floor 16 in a trailer, wherein the floor comprises a plurality of composite hybrid wood boards 11 assembled together by means of a shiplap joint 8 between adjacent boards and at least one board has a first area 17, a second area 18 and a third area 19; wherein the first area has two or more types of wood strips arranged in a pattern, the third area has wood strips in traditional random arrangement and the second area is a transition area between the first and third areas. For example, the first area may comprise a pattern of oak and poplar wood strips and the third area may comprise red oak, white oak or mixed oak. The higher hardness and decay resistance of oak may be useful in the rear section of the trailer floor close to the rear doors of trailer where the flooring may be subject to a relatively higher degree of damage during service.

Another objective of the disclosure is the method of manufacturing of the hybrid wood boards and composite hybrid wood boards. To determine if the typical factory workers could assemble strips of poplar and oak in an alternating pattern of rows during the fast paced production environment, we conducted test runs. Poplar and oak strips were ripped and sanded using the same machinery used to make traditional oak floor for trailers. The ripped strips were supplied to a group of workers who are trained in the traditional assembly of oak strips (red, white or mix of oak species) for lamination or gluing to make trailer floor. The workers were instructed to lay the oak and poplar strips in a side-by-side alternating pattern of rows for an approximately equal proportion of oak to poplar by volume in the panel. Each row of strips was allowed to be either oak or poplar and not both wood types. The wood strips were roll coated with a commercially available melamine adhesive and then transferred to the assembly station where the workers picked up the strips by hand and manually placed them on the layup conveyor to form a panel. Surprisingly, the typical factory workers were able to visually identify the strips of poplar and oak based on their appearance and assemble them in alternating, pattern of rows to make panels of approximate size of 20 feet long by about 52 inches wide without many incorrect placements of the strips of wood. More than 80% of all the wood strips were correctly placed in the panel to form the alternating pattern of rows. We realized that the distinctive appearance of poplar and oak wood strips provided a unique advantage for building hybrid floor boards, which is an inventive matter related to the method of manufacturing of these floors and having other advantages such as lower weight and lower lumber cost for the hybrid boards than a traditional oak board.

The panels were ripped to make rough boards suitable for further finishing. The rough boards were machined to an approximate final thickness of 1-5/16 inch and 1-1/8 inch and shiplaps were formed at the edges of board. Some boards were planed and sanded for making, composite hybrid wood hoards at the approximate final thickness of 1-1/8 inch. The composite layer was a sheet of glass fiber reinforced epoxy having fibers along the length and width of the sheet. The thickness of the sheet was about 0.05 inch. The composite layer was generally a bi-directional laminate of glass fibers and epoxy polymer with a majority of the fibers along a major axis of the composite sheet. The composite layer was bonded to the underside of some of the hybrid wood floor boards with a polyurethane hotmelt adhesive.

The oak and poplar strips were arranged in alternating pattern as represented in FIG. 2 and FIG. 3. The width of the finished boards was approximately 12 inches. Randomly selected board specimen were tested to evaluate dry shear strength and wet shear strength of the glue bonds between wood strips using industry standard tests for trailer flooring as set by Technology and Maintenance Council's Recommended Practice 723A (TMC RP 723A). The dry shear strength (Table 2 below) and wet shear strength (Table 3 below) exceeded the minimum shear strength requirements for trailer flooring.

TABLE 2

Dry shear test of glue bonds between wood strips

| Type of Floorboard | Thickness (inch) | Average Shear Strength (psi)* | Requirement (psi)* |
|---|---|---|---|
| Traditional Oak | 1-5/16 | 2642 | 1850 |
| Traditional Oak Composite | 1-1/8 | 2893 | 1850 |
| Hybrid Oak-Poplar Composite | 1-1/8 | 2630 | 1850 |

*Pounds per square inch

TABLE 3

Wet shear test of glue bonds between wood strips

| Type of Floorboard | Thickness (inch) | Average Shear Strength (psi)* | Requirement (psi) |
|---|---|---|---|
| Traditional Oak | 1-5/16 | 1256 | 600 |
| Traditional Oak Composite | 1-1/8 | 1409 | 600 |
| Hybrid Oak-Poplar Composite | 1-1/8 | 1653 | 600 |

*Pounds per square inch

The bend strengths of the floor boards were measured at a beam span of 30 inches and were found to exceed the industry requirements (Table 4 below). Samples of floor boards were evaluated for MOR (Modulus of Rupture) and MOE (Modulus of Elasticity) properties by three-point bending test at a span of 30 inches. MOR is a measure of the bending strength and MOE is a measure of resistance to bending deflection of the floor board. The MOR and MOE for oak-poplar composite hybrid wood boards were comparable to typical properties of traditional oak composite floorboards (Table 5 below).

TABLE 4

Bend test of floor boards

| Type of Floorboard | Thickness (inch) | Average Bend Strength (lbs)* | Requirement (lbs)* |
|---|---|---|---|
| Traditional Oak | 1-5/16 | 5407 | 3850 |
| Traditional Oak Composite | 1-1/8 | 8410 | 3650 |
| Hybrid Oak-Poplar Composite | 1-1/8 | 7114 | 3850 |

*Pounds

TABLE 5

Three point bend test of floor boards

| Type of Floorboard | Thickness (inch) | MOR (psi)* | MOE (million psi) |
|---|---|---|---|
| Traditional Oak | 1-5/16 | 12,500 | 1.60 |
| Traditional Oak Composite | 1-1/8 | 23,500 | 2.10 |
| Hybrid Oak-Poplar Composite | 1-1/8 | 20,406 | 2.06 |

*Pounds per square inch

The weights of floor boards were measured and the weight per square foot (sqft) of the floor boards were determined (Table 6 below). The oak-poplar composite hybrid boards were lighter than the traditional oak composite boards at the same thickness of 1-1/8 inch of the boards by about 0.7 lbs/sqft. The lighter composite hybrid wood boards can save about 399 lbs (pounds) of weight compared to the 1-5/16 inch thick traditional oak floor in a typical dry van trailer using about 380 sqft of wood flooring. The traditional oak composite boards can save a much lower weight of about 133 lbs in a dry van trailer compared to traditional oak floor. The thinner and lighter composite hybrid wood board is also significantly stronger than the heavier traditional oak board.

TABLE 6

Weight of floorboards and weight savings for trailer floor

| Type of Floorboard | Thickness (inch) | Unit Weight (lbs/sqft)* | Weight Saving** (lbs/sqft) | Weight Saving*** (lbs per Trailer) |
|---|---|---|---|---|
| Traditional Oak | 1-5/16 | 5.1 | — | — |
| Traditional Oak Composite | 1-1/8 | 4.75 | 0.35 | 133 |
| Hybrid Oak-Poplar Composite | 1-1/8 | 4.05 | 1.05 | 399 |

*Pounds per square foot
**Weight Saving relative to the weight of 1-5/16 inch traditional oak floor
***Weight Saving for a trailer floor with an area of 380 square feet Composite hybrid wood floor boards made with oak and poplar wood strips offer several advantages. The mechanical properties such as dry shear strength, wet shear strength and bend strength exceed the minimum requirement for trailer flooring application. Further, mixing of poplar with oak provides significant cost reduction and weight reduction for composite hybrid wood floor compared to traditional oak composite floor. Weight reduction allows for hauling more freight in the trailer and for improved efficiency of transportation of cargo. Alternatively, weight reduction leads to fuel savings for the truck-trailer. Alternating pattern of rows of oak and poplar strips in the hybrid floor board provides less variation in the performance characteristics of the floor such as bending strength, resistance to deflection, shear strength. Further, the alternating pattern of rows of strips has the ability to provide more consistent wear of floor surface and resistance to indentation across the width of the board compared to random arrangement of oak and poplar strips in the floor board. Even though poplar is not as hard as oak and has less resistance to wear and indentation, the hybrid floor made of poplar and oak provides improved performance while reducing cost and weight.

While we have shown and described several embodiments in accordance with our disclosure, it is to be clearly understood that the same ma be susceptible to numerous changes apparent to one skilled in the art. Therefore, we do not wish to be limited to the details shown and described but intend to show all changes and modifications that come within the scope of the appended claims.

What is claimed is:

1. A composite hybrid wood board for use in a cargo-carrying trailer floor, the composite hybrid wood board having a length along a major axis, a width along a minor axis, an upper surface, a lower surface, and a thickness between the upper surface and lower surface, the composite hybrid wood board comprising:
    an upper layer of a hybrid wood board,
    wherein the hybrid wood board comprises a plurality of hardwood strips having longitudinal and lateral edges, each of the hardwood strips having a front end, a back end, a length and width less than the length and width of the hybrid wood board, respectively;
    wherein the ends of the hardwood strips are shaped to form a longitudinal connection or end-joint with other strips at the front end and back end of the hardwood strips;
    and the hardwood strips are arranged in side-by-side rows and glued together to form the hybrid wood board;
    said hybrid wood board having a rectangular projecting lip running along the length of the board at an edge of the board and further having a crusher bead at an edge of the board;
    wherein the hardwood strips comprise a first type and a second type of hardwood strips, the first type of hardwood strips comprising one or more species of hardwood and the first type of hardwood strips having a first average specific gravity; the second type of hardwood strips comprising one or more species of hardwood and the second type of hardwood strips having a second average specific gravity,
    wherein the first type of hardwood strips comprises one or more species of hardwood selected from the group consisting of red oak, white oak, mixtures of red and white oak, hard maple, hickory and any combinations thereof; and where the second type of hardwood comprises one or more species of hardwood selected from the group consisting of poplar, birch, beech, soft maple, ash, and any combinations thereof; and
    wherein the first average specific gravity is higher than the second average specific gravity, and the first and second types of hardwood strips are arranged next to one another both along the longitudinal and lateral edges of each respective hardwood strip in order to form a pattern of parallel, repeating rectangular strips in at least a portion of the hybrid wood board, wherein said pattern of parallel, repeating rectangular strips is selected from the group consisting of:
        two adjacent rows of hardwood strips of the first type are in an alternating pattern with two adjacent rows of hardwood strips of the second type in at least a portion of the board; and
        two or three adjacent rows of hardwood strips of the first type are in an alternating pattern with two or three adjacent rows of hardwood strips of the second type in a least a portion of the board; and
    a bottom layer of a fiber reinforced polymer composite, wherein the bottom layer is bonded to the upper layer, and the average dry shear strength of glue bonds between hardwood strips exceeds 1850 psi.

2. The composite hybrid wood board of claim 1, wherein the first average specific gravity is higher than 0.6 and the second average specific gravity is lower than 0.6 at about 12 percent average moisture content of hardwood.

3. The composite hybrid wood board of claim 1, wherein the first average specific gravity is at least about 5% higher than the second average specific gravity.

4. The composite hybrid wood board of claim 1, wherein the fiber reinforced polymer composite comprises glass, carbon, aramid, or steel, and a thermosetting or thermoplastic polymer comprising epoxy, polyester, vinyl ester, phenolic, polypropylene, nylon, or polyethylene terephthalate (PET).

5. The composite hybrid wood board of claim 1, wherein as compared to a 1 5/16 inch thick traditional oak board in a vehicular trailer for carrying cargo using about 380 sq. ft. (square feet) of wood flooring, a 1 5/16 inch thick composite hybrid wood board using about 380 sq. ft. of wood flooring provides a weight savings of greater than 133 lbs. (pounds).

6. A composite hybrid wood floor in a vehicular trailer for carrying cargo, the composite hybrid wood floor comprising a plurality of composite hybrid wood boards, said trailer having a front end and rear end;
    each of the composite hybrid wood boards having a length along a major axis, a width along a minor axis, an upper surface, a lower surface and a thickness between the upper surface and lower surface and two lateral edges along the major axis; and
    each of the composite hybrid wood boards comprises:
        an upper layer of hybrid wood board having a first area by the front end of trailer, a third area by the rear end of trailer and a second area of transition between the first and third areas; and
        a bottom layer of fiber reinforced polymer composite,
    wherein the upper layer of hybrid wood board comprises a plurality of hardwood strips having longitudinal and lateral edges, each hardwood strip having a length and width less than the length and width of a hardwood board, respectively; wherein the hardwood strips are arranged in side-by-side rows and glued together to form the hardwood board and the hardwood strips comprising a first type and a second type of hardwood strips;
    wherein the first type of hardwood strips comprises one or more species of hardwood selected from the group consisting of red oak, white oak, mixture of red and white oaks and hard maple; wherein the second type of hardwood strips comprises one or more species of hardwood selected from the group consisting of poplar, birch, beech, soft maple, and ash; and
    wherein the first and second types of hardwood strips are arranged next to one another both along the longitudinal and lateral edges of each respective hardwood strip in order to form a pattern of parallel, repeating rectangular strips in at least a portion of the first area of the hybrid wood board, wherein said pattern of parallel, repeating rectangular strips is selected from the group consisting of:

two adjacent rows of hardwood strips of the first type are in an alternating pattern with two adjacent rows of hardwood strips of the second type in at least a portion of the board; and two or three adjacent rows of hardwood strips of the first type are in an alternating pattern with two or three adjacent rows of hardwood strips of the second type in a least a portion of the board, and wherein the bottom layer of fiber reinforced polymer composite is bonded to the upper layer of hybrid wood board.

7. The composite hybrid wood floor of claim 6, wherein a portion of the third area of the hybrid wood board comprises hardwood strips selected from the group consisting of red oak, white oak, mixed oak and hard maple species.

8. The composite hybrid wood floor of claim 7, wherein the fiber reinforced polymer composite comprises glass, carbon, aramid, or steel, and a thermosetting or thermoplastic polymer comprising epoxy, polyester, vinyl ester, phenolic, polypropylene, nylon, or polyethylene terephthalate (PET).

9. The composite hybrid wood floor of claim 6, wherein as compared to a 1 5/16 inch thick traditional oak floor in a vehicular trailer for carrying cargo using about 380 sq. ft. (square feet) of wood flooring, a 1 5/16 inch thick composite hybrid wood board using about 380 sq. ft. of wood flooring provides a weight savings of greater than 133 lbs. (pounds).

10. A composite hybrid wood floor in a vehicular trailer for carrying cargo, wherein the composite hybrid wood floor comprises a plurality of composite hybrid wood boards of claim 1.

* * * * *